United States Patent
Dev et al.

(10) Patent No.: US 11,403,156 B2
(45) Date of Patent: Aug. 2, 2022

(54) API HUB ARCHITECTURE

(71) Applicant: The Bank of New York Mellon, New York, NY (US)

(72) Inventors: Raghu K. Dev, Reston, VA (US); Alex A. Dashore, Marlboro, NJ (US); Nitin M. Kothavale, Somerset, NJ (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 17/060,580

(22) Filed: Oct. 1, 2020

(65) Prior Publication Data

US 2021/0096938 A1 Apr. 1, 2021

Related U.S. Application Data

(60) Provisional application No. 62/909,093, filed on Oct. 1, 2019.

(51) Int. Cl.
 *G06F 9/54* (2006.01)
 *H04L 29/06* (2006.01)
 *H04L 67/133* (2022.01)

(52) U.S. Cl.
 CPC ............ *G06F 9/547* (2013.01); *H04L 67/133* (2022.05)

(58) Field of Classification Search
 None
 See application file for complete search history.

(56) References Cited

U.S. PATENT DOCUMENTS

| | | | | |
|---|---|---|---|---|
| 8,726,270 | B2* | 5/2014 | Kane | G06F 8/61 717/176 |
| 9,930,103 | B2* | 3/2018 | Thompson | H04L 67/2804 |
| D834,518 | S | 11/2018 | Hung et al. | |
| 10,171,383 | B2* | 1/2019 | Johnston | G06F 8/65 |
| 10,491,633 | B2* | 11/2019 | Kling | G06F 21/6218 |
| 10,623,476 | B2* | 4/2020 | Thompson | H04L 67/2804 |
| 10,645,087 | B2* | 5/2020 | Mott | H04L 63/20 |
| 10,659,400 | B2* | 5/2020 | Moon | H04L 51/02 |
| 10,664,312 | B2* | 5/2020 | Moloian | G06F 11/3051 |

(Continued)

OTHER PUBLICATIONS

Dixon; "Pattern Recognition with Partly Missing Data"; Oct. 1979; IEEE Transactions on Systems, Man, and Cybernetics, vol. 9, No. 10; pp. 617-621. (Year: 1979).*

*Primary Examiner* — Umut Onat
(74) *Attorney, Agent, or Firm* — Fenwick & West LLP (57) ABSTRACT

An application programming interface (API) hub architecture establishes relationships among the provisioning systems, the IAM target systems, and an intermediate API hub system. A provisioning system can send the API hub system a message in a format associated with the IAM system. The API hub determines and identifies which of one or more available IAM systems should receive the message. The API hub system translates the message into a correct format for each of the determined target IAM systems and sends the translated messages to the appropriate target systems. Similarly, the API hub system can receive a message from an IAM system, identify, based on the message, which of one or more provisioning systems should receive the message, translate the message into an appropriate format for each of the determined one or more provisioning systems, and send the formatted message to the determined provisioning systems.

15 Claims, 6 Drawing Sheets

(56) References Cited

U.S. PATENT DOCUMENTS

| | | | |
|---|---|---|---|
| 10,719,373 B1* | 7/2020 | Koponen | H04L 9/0891 |
| 10,841,153 B2* | 11/2020 | Dakshinyam | H04L 41/5051 |
| 10,977,738 B2* | 4/2021 | Wang | G06N 20/00 |
| 2016/0301739 A1* | 10/2016 | Thompson | G06F 9/547 |
| 2018/0351957 A1* | 12/2018 | Mott | H04L 63/102 |
| 2020/0112526 A1* | 4/2020 | Moon | G06N 20/00 |
| 2020/0177448 A1* | 6/2020 | Dakshinyam | G06F 16/1805 |
| 2020/0211120 A1* | 7/2020 | Wang | G06Q 40/08 |
| 2020/0213324 A1 | 7/2020 | Hecht | |
| 2020/0293541 A1* | 9/2020 | Pigeon | G06F 9/547 |
| 2020/0327371 A1* | 10/2020 | Sharma | G06N 5/04 |
| 2020/0357003 A1* | 11/2020 | Buzek | G06Q 30/0185 |

* cited by examiner

API HUB ARCHITECTURE

CROSS-REFERENCE TO RELATED APPLICATIONS

This application claims the benefit of U.S. Provisional Application No. 62/909,093, filed Oct. 1, 2019, which is incorporated herein by reference in its entirety.

BACKGROUND

Field of Art

This disclosure relates generally to identity and access management and more particularly to automatically formatting instructions for multiple identity and access management systems.

Description of Art

Identity and access management (IAM) systems are used to manage the lifecycle of user data for an organization. The IAM systems store information about users including identity and attributes, authentication data, and authorizations. Provisioning systems communicate with IAM systems to provide user data (e.g., for authenticating and providing access to a user), or to receive information from an IAM system.

Provisioning systems provide "deep" connections to target IAM systems by communicating with the IAM systems using low level logic of each of the IAM systems for which the provisioning system must be specially and separately configured to be able to communicate with each target IAM system. Although many IAM systems operate using a subset of the same user attribute information different IAM systems may have different specific requirements, and may use different APIs. It can be difficult and time consuming for an organization to configure a provisioning system that can interact with many IAM systems.

SUMMARY

An application programming interface (API) hub architecture establishes relationships among the provisioning systems, the IAM target systems, and an intermediate API hub system. A provisioning system can send the API hub system a message in a format associated with the IAM system. The API hub determines and identifies which of one or more available IAM systems should receive the message. The API hub system translates the message into a correct format for each of the determined target IAM systems and sends the translated messages to the appropriate target systems. Similarly, the API hub system can receive a message from an IAM system, identify, based on the message, which of one or more provisioning systems should receive the message, translate the message into an appropriate format for each of the determined one or more provisioning systems, and send the formatted message to the determined provisioning systems.

The features and advantages described in this summary and the following detailed description are not limiting and not all-inclusive. Many additional features and advantages will be apparent to one of ordinary skill in the art in view of the drawings, specification, and claims hereof.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
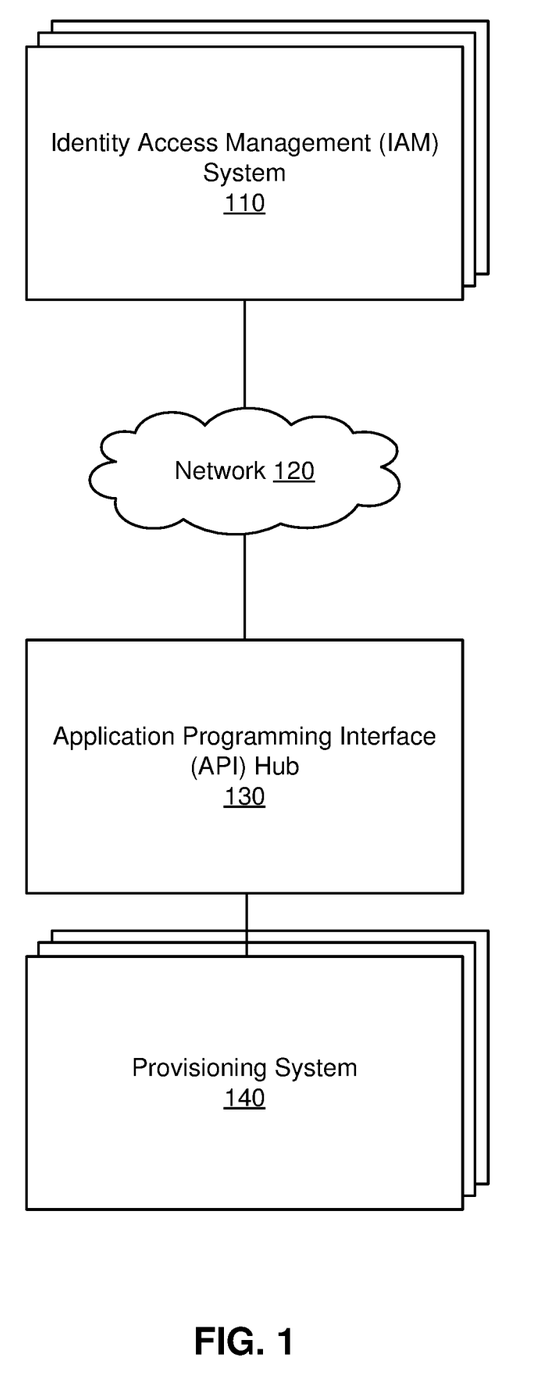
FIG. 1 is a high level block diagram of a system environment for an API hub, in accordance with an embodiment.

FIG. 1 is a high level block diagram of a system environment for an API hub in accordance with an embodiment. FIG. 1 includes an identity access management (IAM) system 110, a network 120, an application programming interface (API) hub 130, and a provisioning system 140. Various embodiments of the system environment can include any number of IAM systems 110 and any number of provisioning systems 140. The functions performed by the various entities of FIG. 1 may vary in different embodiments.

The identity access management (IAM) system 110 is a target application or system with which the provisioning system 140 interfaces to provide additional services, access, or functionalities to users. An IAM system 110 may be a custom application associated with a provisioning system 140, or an external application, platform, or database. A provisioning system 140 may interface with many different IAM systems 110, for example, to provide a variety of services to the users of a centralized system associated with the provisioning system 140.

The provisioning system 140 controls user information stored with relation to a centralized authorization management system, for example, a system, enterprise, or organization that has information about a user base (e.g., a bank, school, business, etc.) and that also interfaces with additional applications or platforms to provide services to the users. The provisioning system 140 may control the authentication of a user's identity, access privileges, and authorizations for use on associated applications. The provisioning system 140 may also manage descriptive information about users as well as information about who has authority to access and modify user data. In some embodiments, a central system may be associated with multiple provisioning systems 140 for interacting with IAM systems 110.

The API hub 130 is an intermediate system that provides translations of provisioning request messages sent between IAM systems 110 and provisioning systems 140. Examples of provisioning request messages include requests to join a group, leave a group, add a new user, delete an account, update data associated with an account, and change permissions, in accordance with some embodiments. The API hub 130 receives messages or instructions for a target IAM system 110 from a provisioning system 140 and translates the messages or instructions from the provisioning system 140 into a format that can be interpreted as input by the IAM system 110 to which it is directed. For example, functionalities of each IAM system 110 may be accessed with a different API. In various embodiments, the API hub 130 may translate between a variety of systems that use different APIs or different message formats. That is, the API hub 130 may be configured to support translation between systems for purposes other than identity access management.

The API hub 130, provisioning systems 140, and IAM systems 110 may communicate via the network 120, which may comprise any combination of local area and wide area networks employing wired or wireless communication links. In some embodiments, all or some of the communication on the network 120 may be encrypted.

Figure 2:
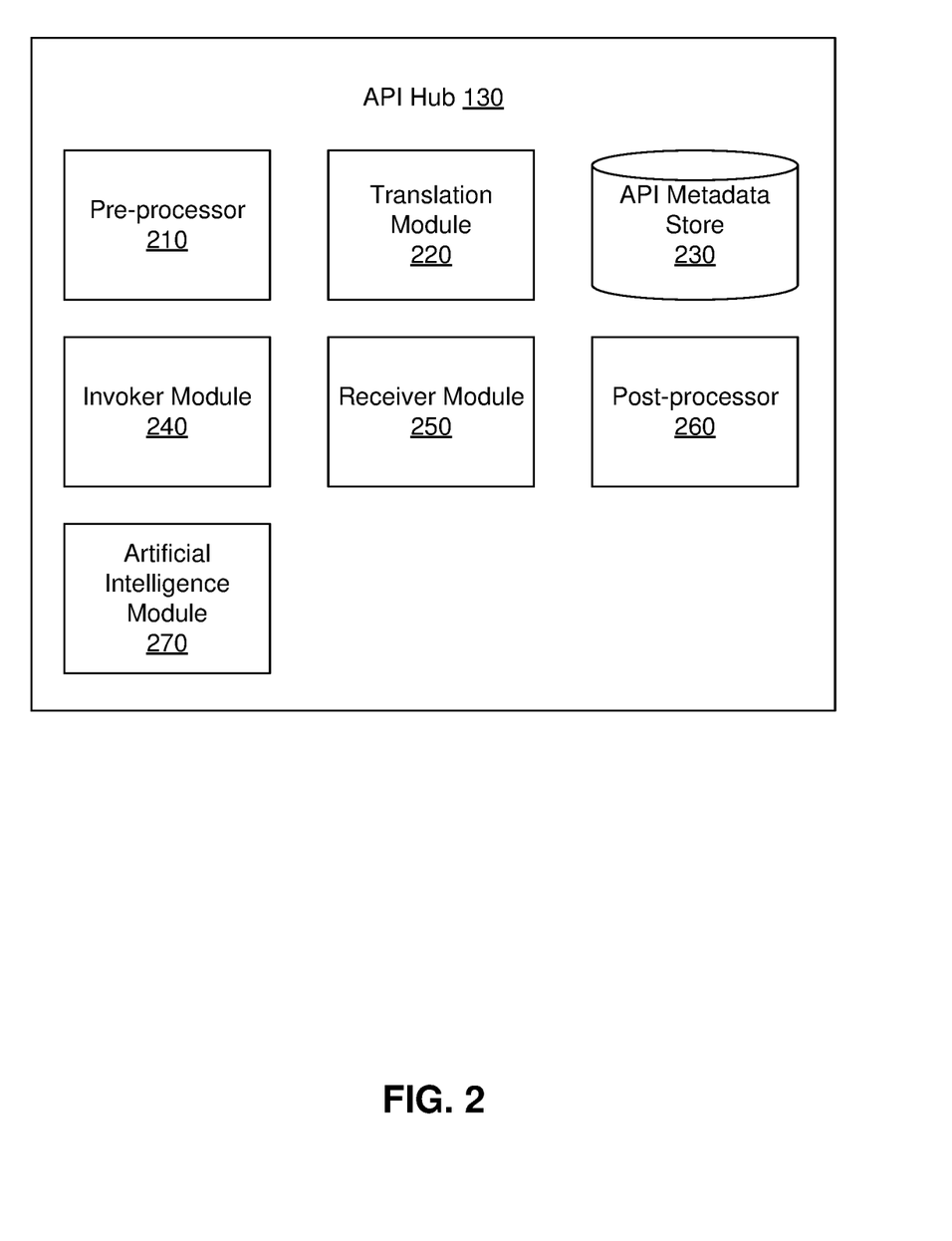
FIG. 2 is a high level block diagram of a system architecture for an API hub, in accordance with an embodiment.

FIG. 2 is a high level block diagram of a system architecture for an API hub 130, in accordance with an embodiment. The API hub 130 includes various modules and data stores for translating messages sent between IAM systems 110 and provisioning systems 140. The API hub 130 comprises a pre-processor 210, a translation module 220, an API metadata store 230, an invoker module 240, a receiver module 250, and a post-processor 260. In some embodiments, the API hub 130 may further include an artificial intelligence module 270. The API hub 130 may include services and other functionality for other features that are not shown herein. Likewise, computer components such as web servers, network interfaces, security functions, load balancers, failover services, and management and network operations consoles, are not shown so as to avoid obscuring the details of the system architecture. Additionally, the API hub 130 may contain more, fewer, or different components than those shown in FIG. 2 and the functionality of the components as described herein may be distributed differently from the description herein.

The pre-processor 210 manages provisioning requests and prepares the requests for translation by the API hub 130. In particular, the pre-processor 210 authenticates, validates, and loads incoming provisioning requests into a queue of provisioning requests. In some embodiments, the pre-processor 210 validates a provisioning request message received from a provisioning system 140 by determining whether the message includes the information that will be needed to complete the request. For example the pre-processor 210 may check that a provisioning request includes parameter values for parameters that are associated with the request. In some embodiments, the pre-processor 210 may further determine parameter values associated with a provisioning request for the API hub 130 to obtain from another source. The pre-processor 210 authenticates a provisioning request by determining whether the user sending the request is a user that has permissions to communicate with the applicable IAM system 110 associated with the provisioning request, and that the user has permissions to interact with the IAM system 110.

The translation module 220 translates provisioning requests into IAM system 110 formats. The translation module 220 also translates response messages received from IAM systems 110 into provisioning system 140 formats. To perform translations, the translation module 220 accesses the API metadata store 230 to determine a format associated with the IAM system 110 or systems to which the provisioning request will be sent. In one embodiment, a provisioning request includes an identification of a message type or otherwise identifies the IAM system 110 where the request will be sent. The translation module 220 can use the information about the message type to identify an applicable format for the provisioning request. In some cases, the translation module may also access an external data store to obtain additional information for inclusion in a provisioning request. In one embodiment, expected API formats with API identifier values are stored in the API metadata store 230 and provisioning requests contain an API identifier value that can be matched with the API identifier values stored in the API metadata store 230 to identify the target API format of the target system to which a provisioning request is to be sent.

The API metadata store 230 stores all supported formats that may be expected by one of the IAM systems 110 or by one of the provisioning systems 140. That is, the API metadata store 230 includes API formatting information for each of the IAM systems 110 and each of the provisioning systems to which it may send a message. To accommodate a new IAM system 110, for example, a system administrator or other authorized user of the API hub 130 may input formatting information based on API documentation for the new IAM system 110 into the API metadata store 230. In one embodiment, the API metadata store 230 further stores mapping protocols that indicate how the translation module 220 can convert a provisioning request from a particular provisioning system 140 format into a provisioning request formatted for a particular IAM system 110.

The invoker module 240 queues the translated and formatted provisioning requests and routes each request to the correct IAM system 110. Similarly, the receiver module 250 accepts responses from IAM systems 110, for example, after an IAM system 110 has performed a requested provisioning operation and forwards the responses to the translation module 220 so that the response data can be reformatted for the provisioning system 140.

The post-processor 260 identifies the provisioning system 140 that originated the provisioning request and sends the response to the identified provisioning system 140.

The artificial intelligence module 270 includes computer models that support functions of the pre-processor 210, the translation module 220, and the invoker module 240. In various embodiments, the models may be trained using supervised and unsupervised machine learning techniques. In some embodiments, a model can optimize the functionality of the pre-processor 210 by being trained on received patterns to be able to predict that a necessary parameter is missing from a provisioning request. Another model may be used by the invoker module 240 to prioritize the order of provisioning requests that are sent to the IAM systems 110.

Certain unsupervised learning may be used to train models for the pre-processor 210, the translation module 220, and the invoker module 240. With support from a computer model, the pre-processor 210 stores and updates provisioning data. An unsupervised model may be trained to learn from historical data (e.g., past provisioning requests) and use patterns to predict missing data and correct errors in inputs to provisioning requests. For example, the model may be trained to populate empty domain and location fields in a provisioning request based on source IP address values (e.g., whenever a source IP is xx.xx.30.xx fill in domain and location with India specific details, whenever a source IP is xx.xx.40.xx fill in domain and location with United Kingdom details).

With a trained model, the translation module 220 stores repetitive data and efficiently translates provisioning requests to be sent to the IAM systems 110. For example, models may be trained to combine multiple provisioning requests into a single provisioning request to an IAM system 110. That is, if multiple provisioning requests can be combined according to the target IAM system 110 API, the model may detect and execute the possibility of combining the requests. As another example, a trained model may learn to correlate data across different fields of past provisioning requests of applications to prefill or substitute missing data in provisioning requests.

Trained models may help the invoker module 240 prioritize requests to busy IAM systems 110 based on historical data. Models may also be used to learn and predict delays for provisioning requests to target IAM systems 110. For example, a model may proactively track response times for target systems. If a target IAM system 110 delays a response or stops responding to provisioning requests, the API hub 130 may be trained to defer or hold requests until conditions at the IAM system 110 are cleared.

Semi-supervised learning may also be used to train models for the API hub 130. Models may be trained to inject provisioning priority, to translate provisioning requests using a predefined ruleset as well as learning to correlate rulesets for additional validation, and to detect and respond to unwanted patterns in provisioning requests or in responses received from an IAM system 110. As one example, a model may dynamically define provisioning policies and actions. The system may include a policy that instructs the translation module 220 or the invoker module 240 to prioritize requests with higher indicated priority values. As another example, a policy may include a predefined ruleset for active directory provisioning such as a defined password expiry time and required password length associated with a domain, and the API hub 130 may validate provisioning requests to enforce conditions specified in the policy. In another example, the API hub system may include policies that defer sending provisioning requests to certain platforms by a set amount of time.

Figure 3:
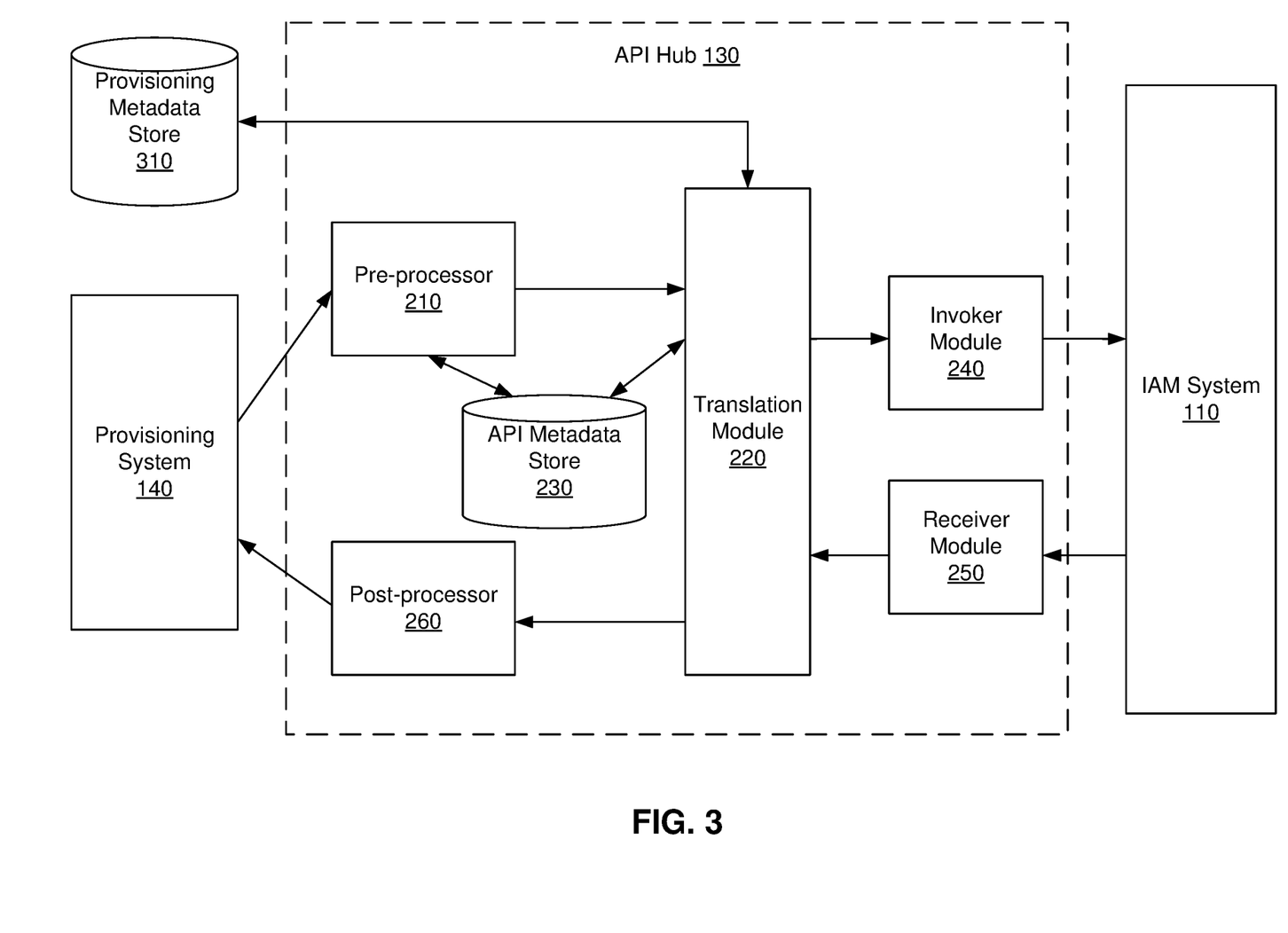
FIG. 3 is an illustration of example interactions among the components of an API hub, in accordance with an embodiment.

FIG. 3 is an illustration of example interactions among the components of an API hub 130, in accordance with an embodiment. The provisioning system 140 generates a provisioning request, for example, to add a user to a user database in a particular IAM system 110. The provisioning system 140 sends the provisioning request to the pre-processor 210. The pre-processor 210 validates the provisioning request by determining whether the provisioning request includes correct data types associated with the parameters of the request. The pre-processor 210 may also determine whether the user making the provisioning request has authorization to send the request to the IAM system 110. In some cases, the pre-processor 210 may access the API metadata store 230 to obtain additional data for parameters of the provisioning request that may be missing values.

The pre-processor 210 sends the validated and authorized provisioning request to the translation module 220. In some embodiments, the translation module 220 may access the API metadata store 230 to add additional information to the provisioning request. In some cases, the translation module 220 may access external sources, such as a provisioning metadata store 310, to obtain additional data for inclusion in the provisioning request. Additional data sources may include databases and websites that are external to the organization with which the API hub 130 is affiliated. For example, if a provisioning request requires a parameter value representing a current stock price, the translation module 220 may access the current stock price by querying a stock market website to fill in the value. As another example, a provisioning request may include a link to an external source for employee details, such as location, address, access authorization details, and entitlements. This information may be fetched using the link and the retrieved information about the employee used to update relevant fields of the provisioning request.

The translation module 220 accesses the API metadata store 230 to obtain a mapping from the provisioning request format into the format for the IAM system 110 to which the provisioning request will be sent. In one embodiment, the provisioning request includes an identification of the IAM system 110. The translation module 220 reformats the provisioning request into the format for the IAM system 110 and forwards the reformatted provisioning request to the invoker module 240. The invoker module 240 sends the reformatted provisioning request to the correct IAM system 110. In some embodiments, the IAM system 110 may be one of a custom application with a standard format API, a custom application with an application-specific API, or another standard platform.

The receiver module 250 receives a response from the IAM system 110, and sends the response to the translation module 220. The translation module 220, in conjunction with the post processor 260, accesses the API metadata store 230 to determine the format for the provisioning system 140 that sent the original provisioning request associated with the response. The translation module 220 formats the response according to the format associated with the provisioning system 140, and sends the formatted response to the provisioning system 140, for example via the post-processor 260.

Figure 4A:
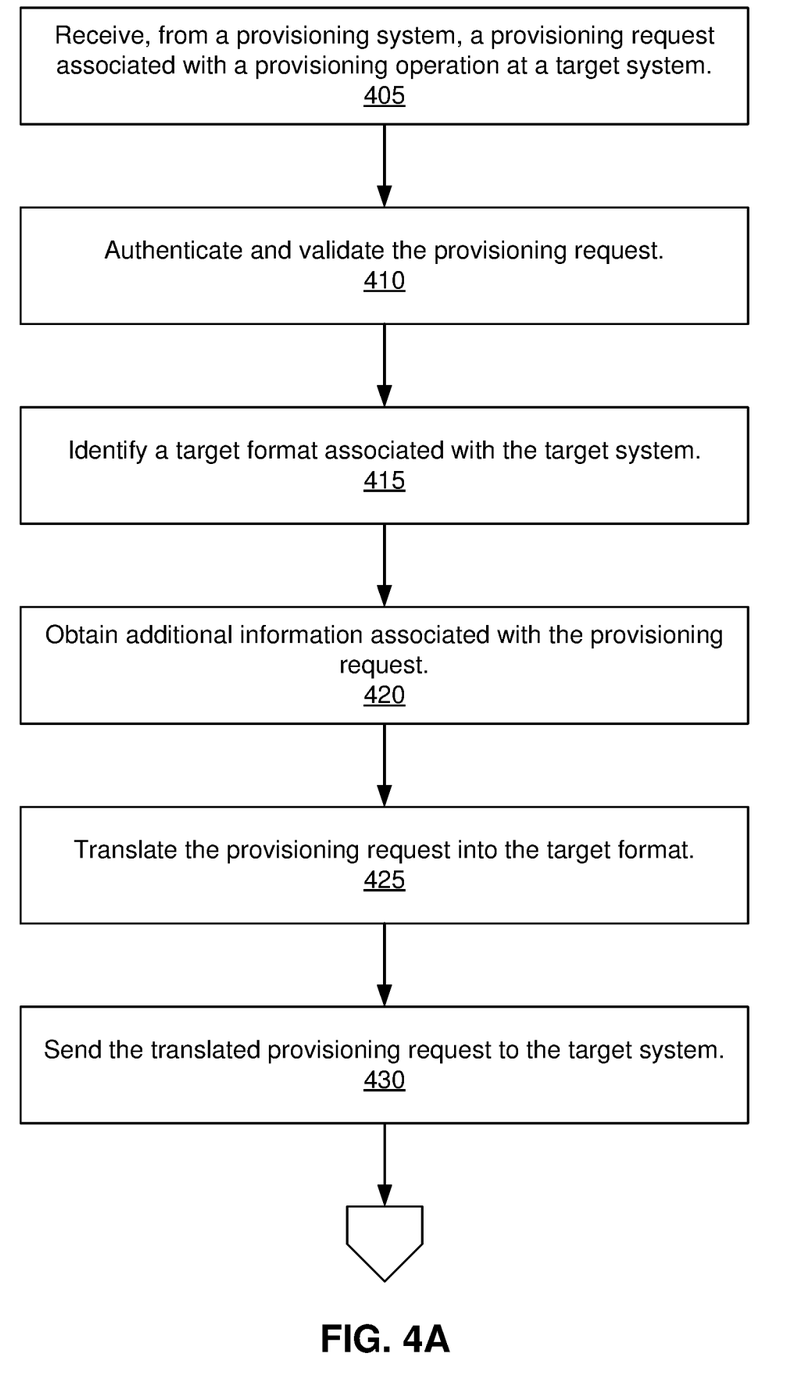
FIG. 4A is a flowchart illustrating a process for translating a provisioning request, in accordance with an embodiment.

FIG. 4A is a flowchart illustrating a process for translating a provisioning request, in accordance with an embodiment. The API hub 130 receives 405, from a provisioning system 140, a provisioning request associated with a provisioning operation at a target IAM system 110. A pre-processor 210 of the API hub 130 authenticates and validates 410 the provisioning request. A translation module 220 of the API hub 130 identifies 415 a target format associated with the target IAM system 110. In some embodiments, the target format is identified by accessing an API metadata store 230 that stores information about mappings between message formats for provisioning systems 140 and message formats for IAM systems (e.g., API documentation). In some cases, the translation module 220 may also obtain 420 additional information associated with the provisioning request. That is, the provisioning request may include parameters for which the translation module 220 accesses an external source to populate with values. The translation module 220 translates 425 the provisioning request into the target IAM system 110 format. An invoker module 240 of the API hub 130 sends 430 the translated provisioning request to the target IAM system 110.

Figure 4B:
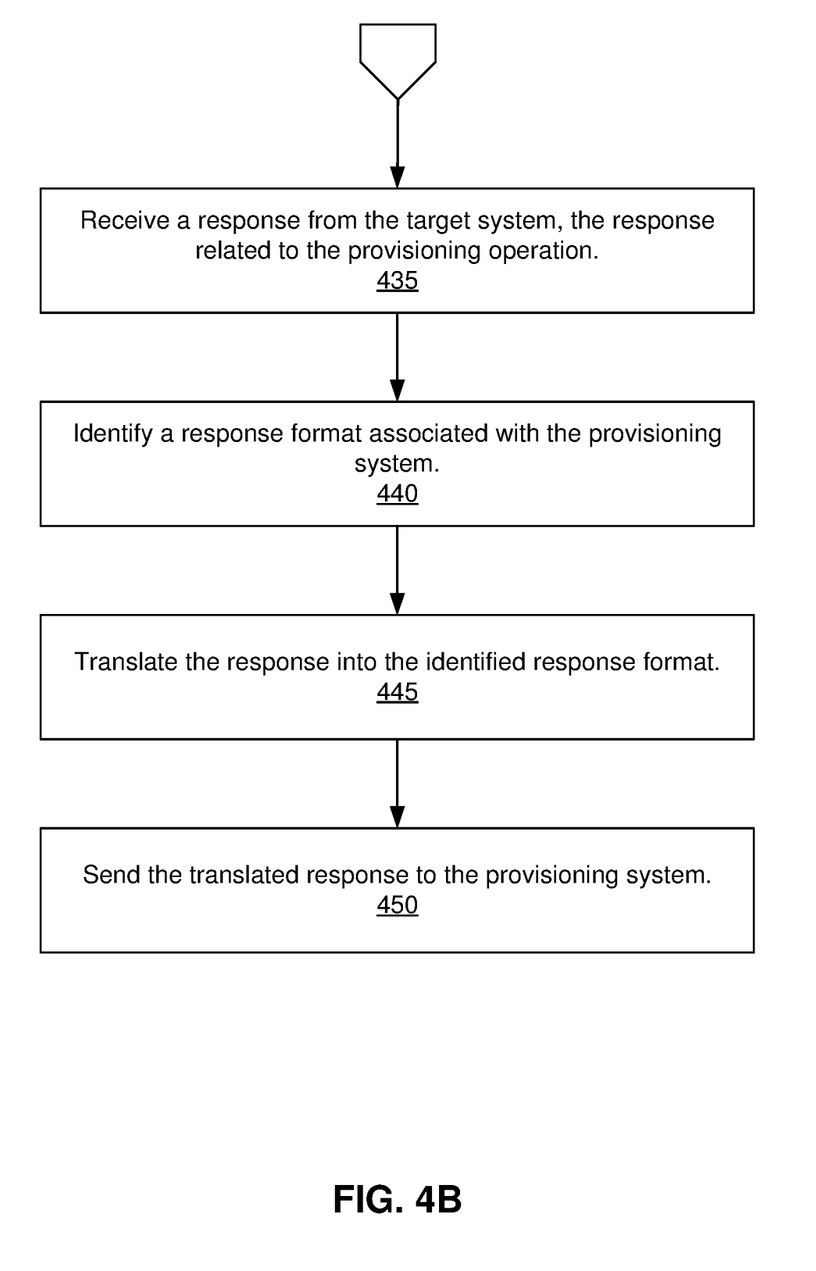
FIG. 4B is a flowchart illustrating a process for translating a response to a provisioning request received from a target system, in accordance with an embodiment.

FIG. 4B is a flowchart illustrating a process for translating a response to a provisioning request received from a target system, in accordance with an embodiment. The API hub 130 receives 435 a response from the target IAM system 110, where the response is related to a provisioning operation performed or other action performed by the IAM system 110. For example, responses from an IAM system 110 may include requested data from a database of the IAM system 110 or may be an acknowledgement message to indicate receipt and implementation of the provisioning request. The receiver module of the API hub 130 sends the received response to the translation module 220 which identifies 440 a response format associated with the provisioning system 140, for example, by accessing information about the response format stored in the API metadata store 230. The translation module 220 translates 445 the response into the identified response format and a post-processor 260 of the API hub 130 sends 450 the translated response to the provisioning system 140.

Figure 5:
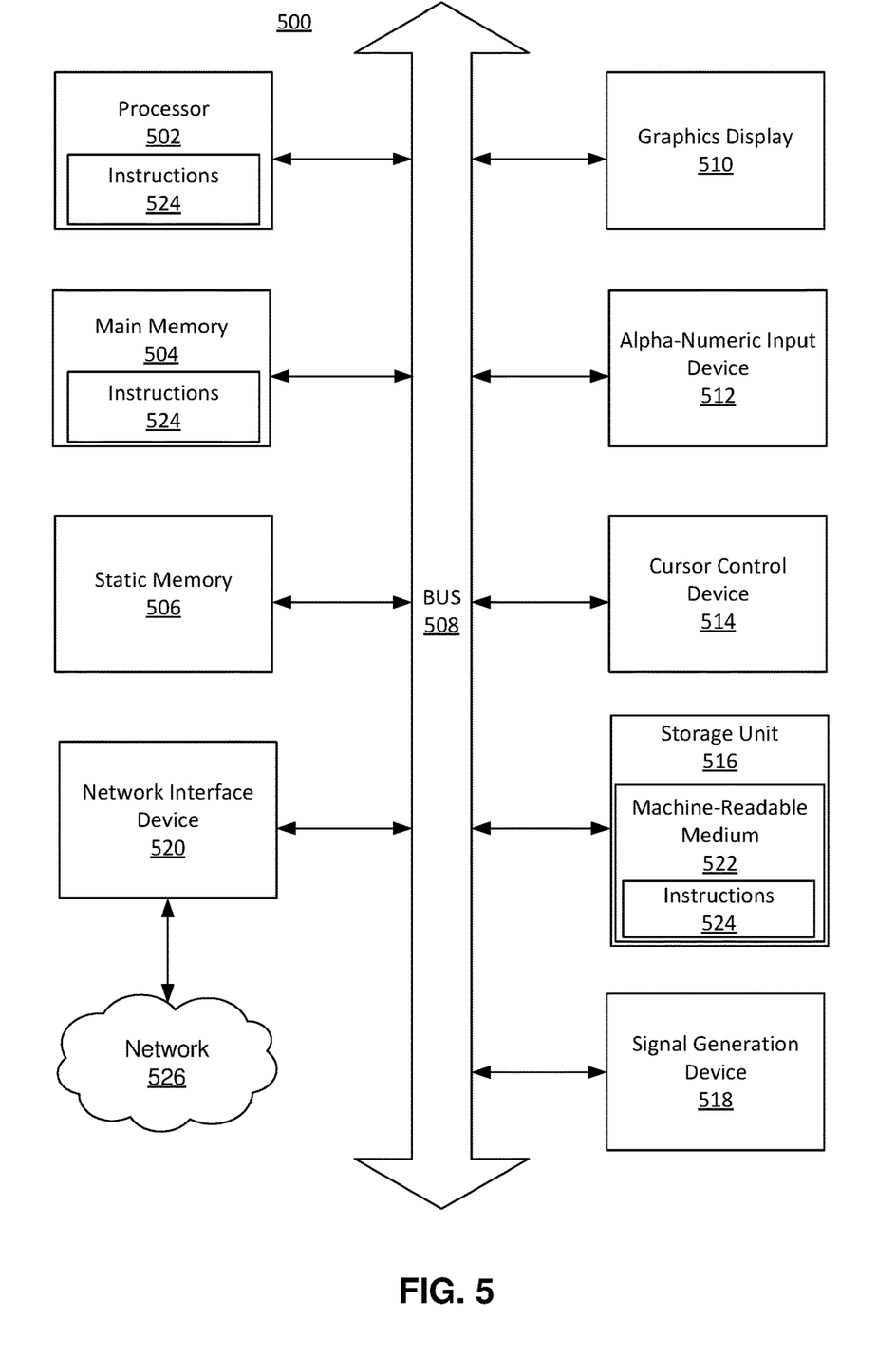
FIG. 5 is a block diagram illustrating components of an example machine able to read instructions from a machine-readable medium and execute them in one or more processors (or controllers).

FIG. 5 is a block diagram illustrating components of an example machine able to read instructions from a machine-readable medium and execute them in one or more processors (or controllers). Specifically, FIG. 5 shows a diagrammatic representation of an API hub 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include instructions for implementing the functionalities of the pre-processor 210, the translation module 220, the invoker module 240, the receiver module 250, the post-processor 260 and/or the artificial intelligence module 270. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
receiving a provisioning request from a provisioning system;
determining, based on contents of the provisioning request, an API associated with a target system to which the provisioning request is directed;
determining that one or more necessary input parameters is missing from the provisioning request, wherein the determination is generated by a machine learning model that is trained to compare the provisioning request to patterns of past provisioning requests and to predict one or more input parameters for which values are not included in the provisioning request;
accessing an external source and obtaining, from the external source, one or more obtained input parameters responsive to the determined missing one or more necessary input parameters;
incorporating the one or more obtained input parameters into the provisioning request;
accessing a data store of mappings between provisioning request formats and API formats;
selecting, from the data store, a direct mapping from the provisioning request format to the determined API associated with the target system;
translating the provisioning request with the incorporated one or more obtained input parameters into the target system API format defined by the determined API using the selected mapping; and
transmitting the translated provisioning request to the target system.

2. The computer-implemented method of claim 1, further comprising accessing an external source and adding information obtained from the external source to the translated provisioning request.

3. The computer-implemented method of claim 1 wherein the target system is an identity and access management system.

4. The computer-implemented method of claim 1, further comprising:
receiving a response from the target system;
identifying the provisioning system that sent the provisioning request associated with the response to the target system;
translating the response into the format for the identified provisioning system; and
transmitting the formatted response to the provisioning system.

5. The computer-implemented method of claim 4, wherein translating the response comprises:
accessing a data store of mapping between API formats associated with target systems and provisioning system response formats; and
selecting, from the data store, a mapping that is associated with the provisioning system response format and the target system API format.

6. A computer system comprising:
one or more computer processors for executing computer program instructions; and
a non-transitory computer-readable storage medium comprising stored instructions executable by at least one of the one or more computer processors, the stored instructions when executed causing the at least one of the one or more computer processors to:
receive a provisioning request from a provisioning system;
determine, based on contents of the provisioning request, an API associated with a target system to which the provisioning request is directed;
determine that one or more necessary input parameters is missing from the provisioning request, wherein the determination is generated by a machine learning model that is trained to compare the provisioning request to patterns of past provisioning requests and to predict one or more input parameters for which values are not included in the provisioning request;
access an external source and obtain, from the external source, one or more obtained input parameters responsive to the determined missing one or more necessary input parameters;
incorporate the one or more obtained input parameters into the provisioning request;
access a data store of mappings between provisioning request formats and API formats;
select, from the data store, a direct mapping from the provisioning request format to the determined API associated with the target system;
translate the provisioning request with the incorporated one or more obtained input parameters into the target system API format defined by the determined API using the selected mapping; and
transmit the translated provisioning request to the target system.

7. The computer system of claim 6, further comprising instructions that cause the at least one of the one or more computer processors to access an external source and add information obtained from the external source to the translated provisioning request.

8. The computer system of claim 6, wherein the target system is an identity and access management system.

9. The computer system of claim 6, further comprising instructions that cause the at least one of the one or more computer processors to:
receive a response from the target system;
identify the provisioning system that sent the provisioning request associated with the response to the target system;
translate the response into the format for the identified provisioning system; and
transmit the formatted response to the provisioning system.

10. The computer system of claim 9, wherein instructions to translate the response comprise instructions that cause the at least one of the one or more computer processors to:
access a data store of mapping between API formats associated with target systems and provisioning system response formats; and
select, from the data store, a mapping that is associated with the provisioning system response format and the target system API format.

11. A non-transitory computer-readable storage medium comprising instructions that, when executed by a processor, cause the processor to:
receive a provisioning request from a provisioning system;

determine, based on contents of the provisioning request, an API associated with a target system to which the provisioning request is directed;

determine that one or more necessary input parameters is missing from the provisioning request, wherein the determination is generated by a machine learning model that is trained to compare the provisioning request to patterns of past provisioning requests and to predict one or more input parameters for which values are not included in the provisioning request;

identify, using a machine learning model trained to compare the provisioning request to patterns of past provisioning requests, one or more input parameters that are missing from the provisioning request;

access an external source and obtain, from the external source, one or more obtained input parameters responsive to the determined missing one or more necessary input parameters;

incorporate the one or more obtained missing input parameters into the provisioning request;

access a data store of mappings between provisioning request formats and API formats;

select, from the data store, a direct mapping from the provisioning request format to the determined API associated with the target system;

translate the provisioning request with the incorporated one or more obtained input parameters into the target system API format defined by the determined API using the selected mapping; and transmit the translated provisioning request to the target system.

12. The non-transitory computer-readable storage medium of claim 11, further comprising instructions that cause the processor to access an external source and add information obtained from the external source to the translated provisioning request.

13. The non-transitory computer-readable storage medium of claim 11, wherein the target system is an identity and access management system.

14. The non-transitory computer-readable storage medium of claim 11, further comprising instructions that cause the processor to:

receive a response from the target system;

identify the provisioning system that sent the provisioning request associated with the response to the target system;

translate the response into the format for the identified provisioning system; and transmit the formatted response to the provisioning system.

15. The computer system of claim 14, wherein instructions to translate the response comprise instructions that cause the processor to:

access a data store of mapping between API formats associated with target systems and provisioning system response formats; and select, from the data store, a mapping that is associated with the provisioning system response format and the target system API format.

* * * * *